Sept. 21, 1926.
C. B. BAILEY
1,600,387
GASKET
Filed June 29, 1925
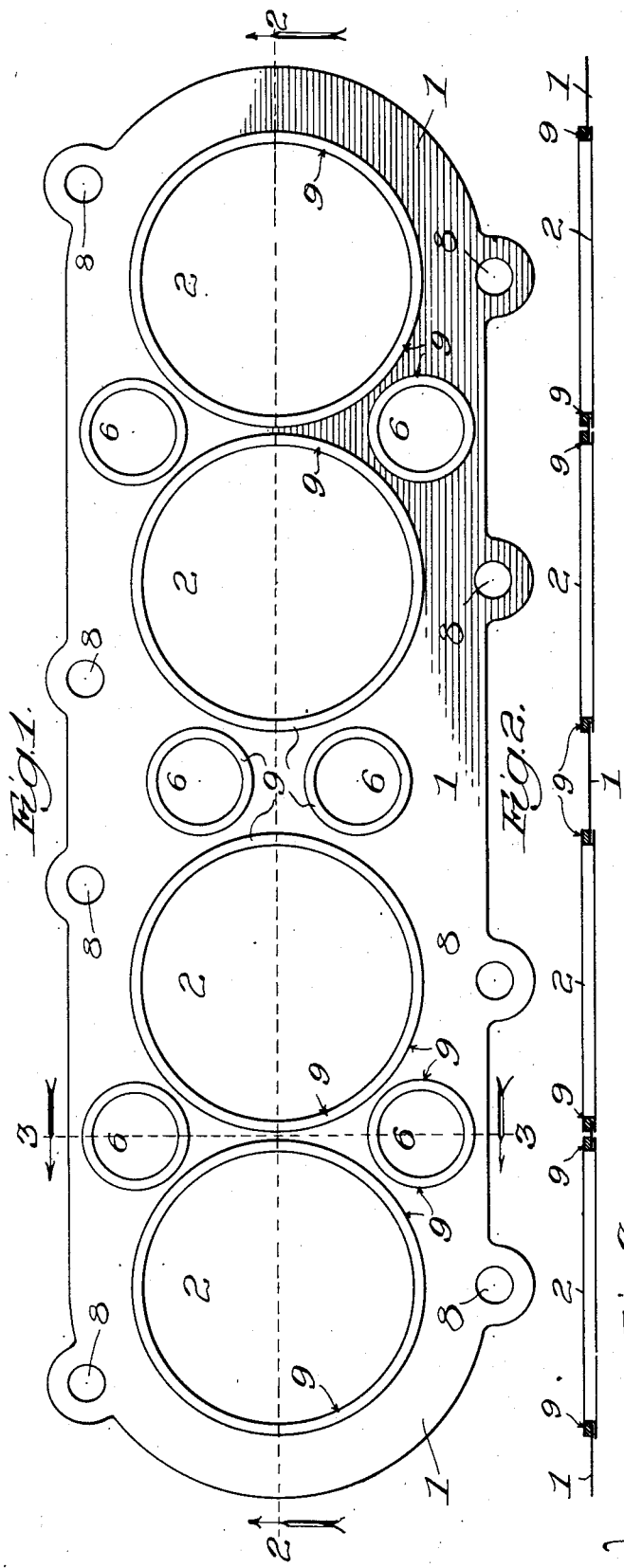
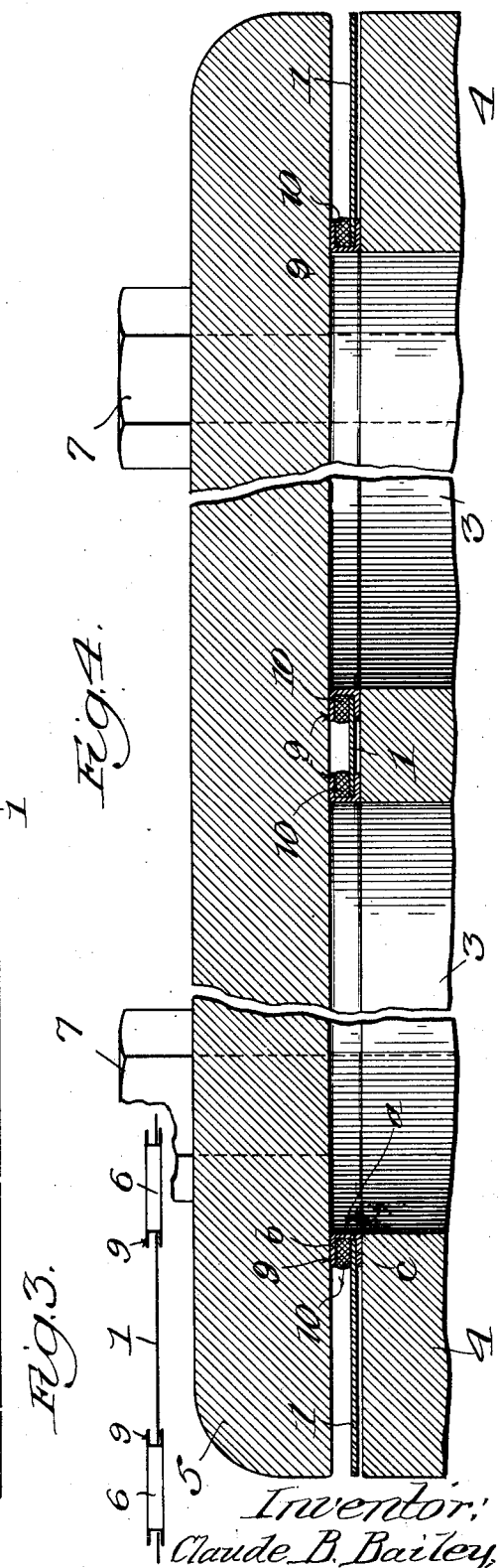
Inventor:
Claude B. Bailey,
By Eugene Cavan
Atty.

Patented Sept. 21, 1926.

1,600,387

UNITED STATES PATENT OFFICE.

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE.

GASKET.

Application filed June 29, 1925. Serial No. 40,179.

The gaskets contemplated by this invention have their body portions of single layers of sheet metal, and have their pressure receiving portions or cushions formed of asbestos or like rings and channel members made of sheet metal and independent of the gasket bodies and inserted in the port holes thereof to hold the rings about the same.

The invention consists further in the matters hereinafter described and claimed.

In the accompanying drawings—

Fig. 1 is a plan view of a cylinder head gasket constructed in accordance with my invention;

Figs. 2 and 3 are longitudinal and vertical sectional views, respectively, on lines 2—2 and 3—3 of Fig. 1; and Fig. 4 is a vertical sectional view showing the gasket clamped in place between a cylinder block and cylinder head of an internal combustion engine.

As shown in the drawings, the gasket has a flat body portion 1 of a single layer of sheet metal, such as copper, brass, aluminum, zinc, or other suitable material. Said gasket has a plurality of relatively large port holes 2, 2 formed in the body 1 and disposed in a row lengthwise thereof. Said holes 2, 2 are substantially the same in size and are arranged to fit about the cylinder bores 3, 3 in the cylinder block 4 against which the gasket is clamped through the cylinder head 5, as shown in Fig. 4. The gasket is further provided with a plurality of smaller port holes 6, 6, also of the same size and arranged to fit about registering water passages in the cylinder block 4 and head 5, respectively, as in structures of this general kind. The head 5 is clamped to the block 4 by studs or bolts 7, 7, the gasket having holes 8, 8 at its margins for said studs, as shown.

The gasket shown in the drawings is designed for a four-cylinder motor with overhead valves, as in Chevrolet cars. The valves and water passages are not shown in Fig. 4 for the purpose of illustration. It is to be of course understood that the gaskets of my invention may be made for other motors with the same or other cylinders and with different valve arrangement.

Sheet metal channel members 9, 9, formed independent of the body 1, are inserted in the port holes 2 and 6. Asbestos or like rings 10, 10 are retained in the channels of the members 9 on one side of the body 1, as shown in Figs. 2 to 4. Said members 9 are made to have portions $a$ extending through the associated port holes and rings and to engage the inner edges thereof for holding the members and rings against lateral displacement on the gasket body. The members 9 are formed with other flanges $b$, $c$ on opposite sides of the body 1 and arranged substantially parallel to each other and to the plane of the body. The flange $b$ overlaps the associated ring 10 and holds the same against the side of the body opposite the flange $c$, the latter engaging against such side of the body 1 to hold the parts thereon.

The channel members 9 and their rings 10 are relatively narrow in width as compared to the width of the gasket body 1 and, being thicker than the body, provide the cushion or pressure receiving portions for the gasket immediately about the port holes. These portions allow all of the available pressure exerted on the gasket on being clamped in place to be concentrated on and confined to said portions to obtain tight joints at the port holes without distributing or wasting the pressure over the entire surface or area of the gasket, as with cylinder head gaskets as heretofore constructed. This is an important feature of the gasket, because it enables tight joints to be had immediately at the port holes with less pressure, and smaller studs may be used or the same size studs as now generally employed may be used with less strain or tension on them to provide tight joints and especially for high pressures as encountered in the cylinders of internal combustion engines. By having the members 9 carried by the gasket body 1 being inserted in the port holes thereof, sufficient metal is provided at the cushion or pressure receiving portion of the gasket to take care of smooth as well as rough surfaces between which the gaskets may be clamped.

The manufacturing cost of the gasket is materially reduced, because the body 1 is in the form of a single metal layer, and the asbestos or like rings are in the form of relatively narrow rings and do not extend over the entire surface or area of the body of the gasket or be coextensive therewith, as with cylinder head gaskets as heretofore in use. Eliminating the asbestos or like layers, blow-outs are prevented and, moreover, the gasket structure is simple and durable.

I do not wish to be limited in the application of my invention to cylinder head gaskets, because the invention may be applied to gaskets of other types and for other uses without departing from the spirit and scope of my invention.

I claim as my invention:—

1. A gasket having a flat body portion of a single layer of sheet metal and having a port hole therein, a sheet metal channel member made independent of the gasket body and inserted in the port hole therein, and an asbestos or like ring in the channel of said member, the latter and the ring being narrower than the width of the gasket body.

2. A gasket having a flat body portion of a single layer of sheet metal and having a port hole therein, a sheet metal channel member made independent of the gasket body and inserted in said port hole, and an asbestos or like ring in the channel of said member, said member having flanges on opposite sides of the body and engaging the body and ring, respectively, and a portion extending through the port hole and ring.

3. A cylinder head gasket having a body portion of a single layer of sheet metal and having a plurality of port holes therein, a plurality of sheet metal channel members formed independent of the gasket body and inserted in the port holes thereof, and asbestos or like rings retained in the channels of said members.

4. A cylinder head gasket having a body portion of a single layer of sheet metal and having a plurality of port holes therein, a plurality of sheet metal channel members formed independent of the gasket body and inserted in the port holes thereof, and asbestos or like rings retained in the channels of said members, said members having portions extending through the port holes and rings and also flanges on opposite sides of the body and engaging the same and the rings.

In testimony whereof I affix my signature this 24 day of June, 1925.

CLAUDE B. BAILEY.